(12) United States Patent
Macho et al.

(10) Patent No.: US 6,678,656 B2
(45) Date of Patent: Jan. 13, 2004

(54) NOISE REDUCED SPEECH RECOGNITION PARAMETERS

(75) Inventors: Dusan Macho, Schaumburg, IL (US); Yan Ming Cheng, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/061,048

(22) Filed: Jan. 30, 2002

(65) Prior Publication Data

US 2003/0144834 A1 Jul. 31, 2003

(51) Int. Cl.[7] .......................... G10L 15/20; G10L 15/06
(52) U.S. Cl. .............................. 704/233; 704/243
(58) Field of Search ................................. 704/224–226, 704/231, 233, 200.1, 243–245, 251, 253

(56) References Cited

U.S. PATENT DOCUMENTS

| 4,630,305 A | * 12/1986 | Borth et al. ................ 704/226 |
| 5,583,961 A | * 12/1996 | Pawlewski et al. ......... 704/243 |
| 5,642,383 A | *  6/1997 | Suzuki .................... 704/200.1 |
| 6,216,103 B1 | *  4/2001 | Wu et al. .................. 704/253 |

OTHER PUBLICATIONS

Lawrence Rabiner and Biing–Hwang Juang, Fundamentals of Speech Recognition, 1993 by AT&T, pp. 91–97.*
Sadaoki Furui and M. Mohan Sondhi, Advances in Speech Signal Processing, 1992 by Marcel Dekker, Inc., pp. 313–320.*

* cited by examiner

Primary Examiner—David D. Knepper
(74) Attorney, Agent, or Firm—Fitch, Even, Tabin & Flannery

(57) ABSTRACT

A voice sample characterization front-end suitable for use in a distributed speech recognition context. A digitized voice sample 31 is split between a low frequency path 32 and a high frequency path 33. Both paths are used to determine spectral content suitable for use when determining speech recognition parameters (such as cepstral coefficients) that characterize the speech sample for recognition purposes. The low frequency path 32 has a thorough noise reduction capability. In one embodiment, the results of this noise reduction are used by the high frequency path 33 to aid in de-noising without requiring the same level of resource capacity as used by the low frequency path 32.

12 Claims, 2 Drawing Sheets

"NOISE REDUCED SPEECH RECOGNITION PARAMETERS"

TECHNICAL FIELD

This invention relates generally to speech recognition, and more particularly to distributed speech recognition.

BACKGROUND

Speech recognition techniques are known. Many speech recognition techniques provide for digitization of the speech information and subsequent processing to facilitate pattern matching that supports recognition of the speech information itself. Such processing often includes characterizing certain aspects of the speech information and representing those characterized aspects in some way, such as with cepstral coefficients. Generally speaking, the accuracy, speed, and reliability of a given speech recognition technique, using any given characterization approach, will improve as pattern matching resources increase. Unfortunately, for many applications, the results of the speech recognition activity are often required in small, portable user devices that have significantly limited resources. As a result, speech recognition for such devices often suffers for lack of such resources.

One proposed solution is to at least partially characterize the speech at the user device, and then provide that characterization information to a remote location (such as a speech recognition server) having significant resources. Those resources can then be used to complete the recognition process with presumed improved accuracy. One such distributed solution has been designed that will suitably process and characterize a voice signal within an 8 KHz frequency band, thereby providing a so-called telephone-band level of service. There are instances, however, when a wider bandwidth frequency band, such as a 16 KHz frequency band, would be desirable. Unfortunately, such an 8 KHz solution is not readily scalable to allow simple accommodation of an increased bandwidth signal. At the same time, however, many 8 KHz solutions are effective for their intended use and represent a desired embodiment for such applications.

One solution would be to simply provide a completely separate embodiment for dealing with larger bandwidth signals. This solution, however, requires completely parallel approaches that can necessitate a commensurate high level of resource dedication.

BRIEF DESCRIPTION OF THE DRAWINGS

The above needs are at least partially met through provision of the method for formation of speech recognition parameters described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

Figure 1:
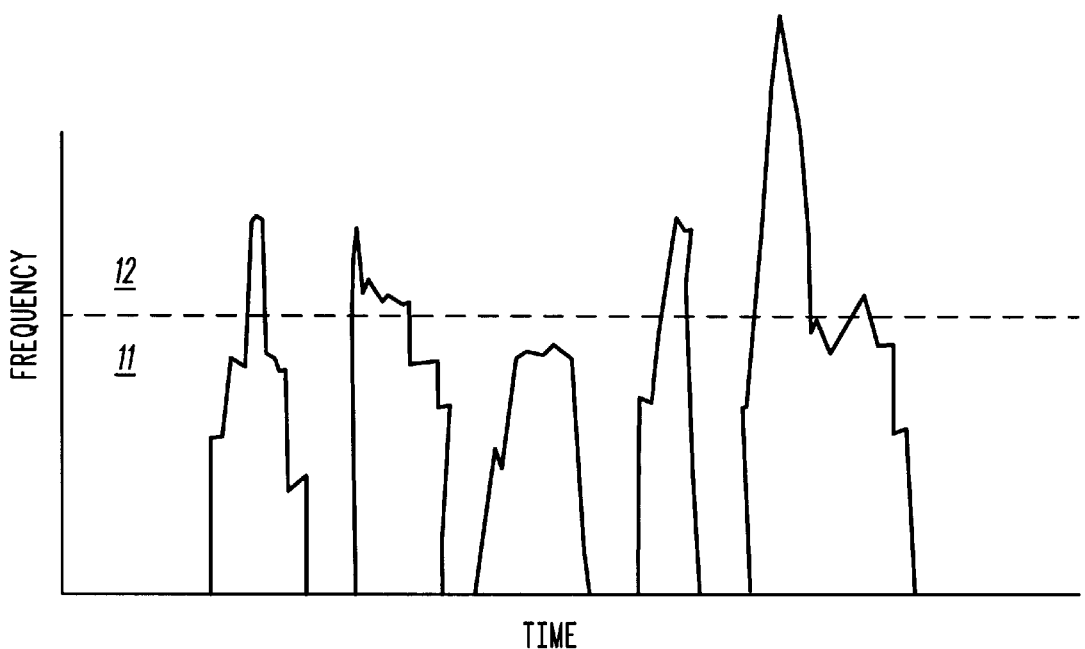
FIG. 1 comprises a time/frequency graph that illustrates example speech signals.

Speech information ordinarily contains more information at lower frequencies than at respective higher frequencies. For example, referring to FIG. 1, a series of speech utterances will often have more spectral content in a lower frequency region 11 (such as, for example, from 0 Hz to 4 KHz) than in a higher frequency region 12 (such as, for example, from 4 KHz to 8 KHz). Therefore, processing only the lower frequency content of a speech signal does allow for at least a certain degree of voice recognition. The higher frequencies do contain some content for many speech samples, however, and the presence or absence of higher frequency content can and will impact the ability of a speech recognition engine to recognize a given speech utterance. Consequently, as noted earlier, it is sometimes desired to include such higher frequency spectral content when characterizing a given speech utterance.

Figure 2:
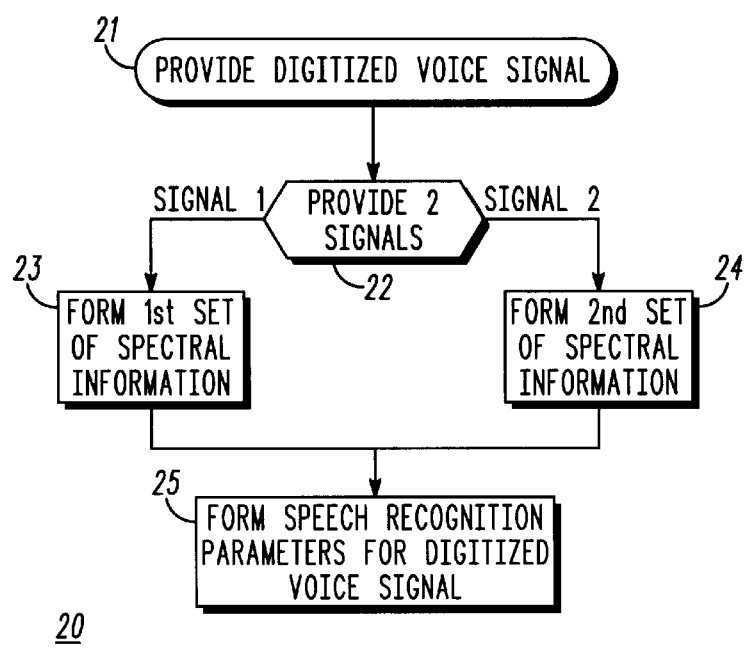
FIG. 2 comprises a high level flow diagram of an embodiment configured in accordance with the invention.

Generally speaking, and with reference to FIG. 2, pursuant to the various embodiments set forth below, a digitized voice signal is provided 21 and then at least two signals (signal 1 and signal 2) are provided 22 as based thereon. A first set of spectral information is formed 23 based upon signal 1 and a second set of spectral information is formed 24 based upon signal 2. Both sets of spectral information are then used to form 25 speech recognition parameters that correspond to the digitized voice signal. In one embodiment, signal 1 can pertain to a low-pass filtered version of the digitized voice signal and signal 2 can pertain to a high-pass filtered version of the digitized voice signal. The speech recognition parameters can be, for example, cepstral coefficients, which coefficients are based upon the spectral information as provided for both band-limited signal paths. In one embodiment, processing-intensive noise reduction for signal can be utilized. The benefits of such noise reduction can then be extended to signal 2 without requiring a commensurate dedication of processing resources. If desired, the first set of spectral information can be formed using established telephone-band distributed speech recognition techniques, thereby allowing the signal path to be used when supporting a telephone-band-only distributed speech recognition process while also allowing the signal 1 path to be used in conjunction with the signal 2 path when supporting a wider-bandwidth distributed speech recognition process.

Figure 3:
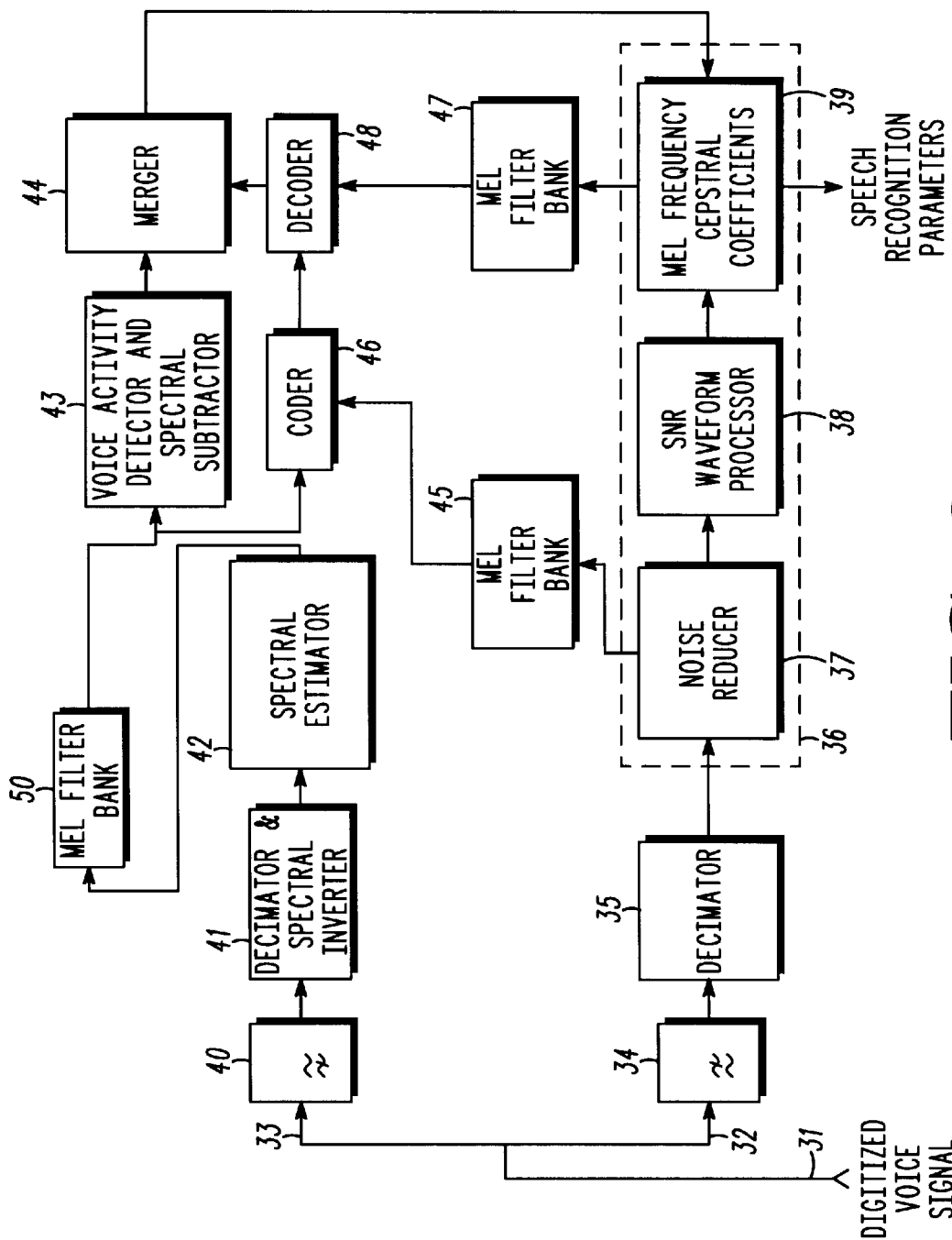
FIG. 3 comprises a block diagram of an embodiment configured in accordance with the invention.

Referring now to FIG. 3, a detailed description corresponding to the above generally described embodiment will be presented.

A digitized voice signal 31 (in this example, a digitized voice signal comprising a 16 KHz signal that constitutes an 8 KHz voice signal sampled at a Nyquist sampling rate) feeds a first path 32 (comprising a low frequency path) and a second path 33 (comprising a high frequency path).

The low frequency first path 32 has a quadrature-mirror filter (QMF) as understood in the art that serves as a low-pass filter 34 (calibrated, in this example, with a 0 to 4 KHz bandpass range). The frequency-limited results then couple to a decimator 35 where the results are decimated by a factor of 2 to reduce the number of representative bits. The decimated frequency-limited results then pass to a noise reduction and speech recognition parameter characterization unit 36 as is known. This unit 36 includes a noise reducer 37, a signal-to-noise ratio waveform processor 38, and a unit 39 that determines mel frequency cepstral coefficients. The noise reducer 37 essentially effects a first pass of noise reduction. Such a noise reducer can be based on Wiener filter theory and can be embodied by, for example, a two-stage mel-frequency domain process such as that set forth in "Two-Stage Mel-Warped Wiener Filter for Robust Speech Recognition" by Agarwal and Cheng (ASRU Keystones, December 1999). The signal-to-noise ratio waveform processor 38 effects additional noise reduction that emphasizes the high signal-to-noise-ratio waveform portions and de-emphasizes the low signal-to-noise-ratio waveform portions and can be embodied by, for example, the processing techniques presented in "SNR-Dependent Waveform Processing for Improving the Robustness of ASR Front-End" by Macho and Cheng, (Proceedings on ICASSP 2001, Salt Lake City, May 2001). The mel frequency cepstral coefficients determinator 39 processes (typically using fast Fourier transforms) spectral estimation information for the low frequency de-noised signal (typically 23 such coefficients to represent the low frequency information). The determinator 39 will typically also usually produce, in addition to the cepstral coefficients, another parameter constituting an energy parameter that represents the log of the energy of the entire signal 1 frequency band. Determination of such coefficients is well understood in the art.

The elements described above are essentially those that will support creation of speech recognition parameters for properly characterizing the lower frequency components of an initial speech signal (in particular, in this example, the 0 to 4 KHz portion of the initial voice information). As noted earlier, such a configuration does not readily scale to accommodate a wider frequency bandwidth input. In particular, the noise reducer 37 is relatively complicated, resource intensive, and particularly designed for use with such a band-limited input, and poses significant design challenges if one wishes to accommodate a wider bandwidth input.

The second signal path 33 serves to supplement the capabilities of the first signal path 32 described above to allow the combined elements to properly process a wider bandwidth input.

The second signal path 33 includes another quadrature-mirror filter set to function as a high-pass filter 40 (in particular, to pass voice information as originally occupied from between 4 KHz to 8 KHz). This high-pass result couples to a decimator and spectral inverter 41 that decimates the incoming bits as a function of "2" and inverts the spectral content thereof, and, thus, shifts the original 4 kHz to 8 kHz frequency band to 0 Hz to 4 kHz frequency band. A spectral estimator 42, using fast Fourier transforms, then estimates the spectral content of the results. This spectral estimation information then passes through a mel filter bank 50 to provide three calculated energies to represent the spectral content of the high-pass signal.

These calculated results then proceed along two different paths. Pursuant to the first path, the results pass to a voice activity detector and spectral subtractor 43. Here, the three mel filter bank energies are used by a simple energy-based voice activity detector to estimate noise in the high frequency band energies (represented here by N(1)). Spectral subtraction is then applied to the three noisy high frequency band energies. This can be expressed as:

$$\hat{S}\_SS_{HF}(l)=\log(\max\{X_{HF}(l)-\alpha N(l)\beta X_{HF}(l)\}) \qquad (1)$$

where $X_{HF}(l)$ are mel-spaced high frequency band energies before applying the logarithm and $\alpha$ and $\beta$ are constants as well understood in the art. The results of the spectral subtraction process are then used as described further below.

Pursuant to the second path, the three mel filter bank energies are coded in a coder 46 as a function of information from the low-pass signal path 32. In particular, spectral estimation values from the noise reducer 37, prior to substantially (or any) de-noising, are processed by a three mel filter bank 45 to provide three log mel-spaced low frequency band energies from the frequency range 2 to 4 KHz (represented here by the expression $S_{LF}(k)$). These energies are then used to code the three log mel-spaced high pass band energies provided by the mel filter bank 50 of the high pass signal path 33 (represented here by the expression $S_{HF}(l)$). Thus, the coding can be represented as:

$$Code(k,l)=S_{LF}(k)-S_{HF}(l) \qquad (2)$$

These coded values are then decoded in a decoder 48 as a function of the de-noised low-pass band signal (in particular, the results of the fast Fourier transform as occurs within the coefficient calculator 39 that represent spectral estimation after de-noising). The de-noised low-pass band spectral estimations are passed through another mel filter bank 47 to provide three log mel-spaced low-frequency band energies (represented here by the expression $\hat{S}hd\ LF(k)$). The output of the decoder 48 can therefore be represented by:

$$\hat{S}\_code_{HF}(l) = \sum_{k=1}^{3} w_{code}(k) \cdot (\hat{S}_{LF}(k) - Code(k,l)) \qquad (3)$$

where $w_{code}(k)$ is an empirically set frequency-dependent weighting.

The decoder 48 output $\hat{S}\_code_{HF}(l)$ and the voice activity detector and spectral subtractor 43 output $\hat{S}\_SS_{HF}(l)$ as described above are then merged by a merger 44. This operation can be expressed by:

$$\hat{S}_{HF}(l)=\lambda\cdot\hat{S}\_code_{HF}(l)+(1-\lambda)\cdot\hat{S}\_SS_{HF}(l) \qquad (4)$$

where $\lambda$ is an empirically set constant chosen to suit a particular application. For the embodiment described above and the frequency ranges selected, setting $\lambda$ to 0.7 has yielded good results.

Both sets of spectral information (i.e. the de-noised mel frequency spectral estimation information for the low frequency information and the calculated energies that represent the spectral content of the high-pass signal) are then used to form the resultant speech recognition parameters that correspond to the digitized voice signal. The speech recognition parameters can be, for example, cepstral coefficients, which coefficients are based upon the spectral information as provided for both band-limited signal paths.

The result of this decoding are decoded high frequency band spectral content that reflects the noise reduction as otherwise provided by the low-pass signal path unit 36. When tested, the above embodiment yielded considerably improved recognition performance. In particular, when tested with speech databases as used in E.T.S.I. standardization project STQ WI008 across various degrees of mismatch between the training and testing of the recognizer engine, the above embodiment demonstrated an average relative recognition improvement of 9.7% as compared to the low band configuration alone.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:

providing a digitized voice signal;

using the digitized voice signal to provide:
- a first signal comprising only a first portion of the digitized voice signal; and
- a second signal comprising only a second portion of the digitized voice signal, wherein the first portion and the second portion of the digitized voice signal are at least partially different from one another;

processing the first signal to reduce at least some noise as may be present in the first signal to provide a noise reduced first signal;

processing the second signal to reduce at least some noise as may be present in the second signal to provide a noise reduced second signal, wherein processing the second signal to reduce at least some noise includes:
- preliminarily processing the second signal to reduce at least some noise as may be present in the second signal to provide a preliminarily noise reduced second signal;
- further processing the preliminarily noise reduced second signal, as a function at least in part of the first noise reduced signal, to provide the second noise reduced signal;

using the first noise reduced signal to form a first set of spectral information;

using the second noise reduced signal to form a second set of spectral information;

forming speech recognition parameters based upon both the first and second set of spectral information, wherein the speech recognition parameters correspond to the digitized voice signal.

2. The method of claim 1, wherein further processing the preliminarily noise reduced second signal includes further processing the preliminarily noise reduced second signal, as a function at least in part, of both the first signal and the first noise reduced signal, to provide the second noise reduced signal.

3. The method of claim 2 wherein processing the first signal to reduce at least some noise includes using spectral estimation.

4. The method of claim 3 wherein forming speech recognition parameters includes forming cepstral coefficients that correspond to the digitized voice signal as represented by both the first and second set of spectral information.

5. A method comprising:

providing a digitized voice signal;

low pass filtering the digitized voice signal to provide a first digitized voice signal;

high pass filtering the digitized voice signal to provide a second digitized voice signal;

processing the first digitized voice signal using a first process to:
- provide a corresponding spectral estimation; and
- to reduce at least some noise as may be present in the first digitized voice signal to provide a noise reduced first digitized voice signal;

providing a processed signal based on the second digitized voice signal;

processing the processed signal as a function, at least in part, of the corresponding spectral estimation to provide a coded representation;

processing the coded representation as a function, at least in part, of the noise reduced first digitized voice signal to provide a de-coded representation;

processing a signal that is based upon the second digitized voice signal as a function, at least in part, of the de-coded representation to reduce at least some noise as may be present in the signal and to provide resultant high frequency information as corresponds to the digitized voice signal;

combining the resultant high frequency information with low frequency information as corresponds to the digitized voice signal to provide combined spectral information for the digitized voice signal;

forming speech recognition parameters based upon the combined spectral information, wherein the speech recognition parameters correspond to the digitized voice signal.

6. The method of claim 5 wherein at least one of the low pass filtering and high pass filtering includes using quadrature mirror filters.

7. The method of claim 6 wherein both the low pass filtering and high pass filtering includes using quadrature mirror filters.

8. The method of claim 5 wherein providing a processed signal based on the second digitized voice signal includes:

using a fast Fourier transform to obtain a spectral estimation;

using a Mel filter bank to determine specific energies with respect to the spectral estimation.

9. The method of claim 8 wherein processing the processed signal as a function, at least in part, of the corresponding spectral estimation to provide a coded representation includes:

using a fast Fourier transform to obtain a spectral estimation that corresponds to the first digitized voice signal;

using a Mel filter bank to determine specific energies with respect to the spectral estimation that corresponds to the first digitized voice signal;

processing the specific energies as correspond to the second digitized voice signal as a function of the specific energies that correspond to the first digitized voice signal to provide the coded representation.

10. The method of claim 9 wherein processing the coded representation as a function, at least in part, of the noise reduced first digitized voice signal to provide a de-coded representation includes:

using a fast Fourier transform to obtain a spectral estimation that corresponds to the noise reduced first digitized voice signal;

using a Mel filter bank to determine specific energies with respect to the spectral estimation that corresponds to the noise reduced first digitized voice signal;

processing the coded representation as a function, at least in part, of the specific energies that correspond to the noise reduced first digitized voice signal to provide a decoded representation of noise.

11. The method of claim 5 and further comprising forming a parameter that corresponds to signal energy of at least substantially an entire frequency band that includes the digitized voice signal by calculating a log energy parameter.

12. The method of claim 11 wherein calculating a log energy parameter includes calculating a log energy parameter using both low-frequency and high-frequency information as sourced by the first and second digitized voice signals.

* * * * *